United States Patent [19]

Gandhi et al.

[11] 4,233,189

[45] Nov. 11, 1980

[54] CATALYST OF RHODIUM ON ZIRCONIA

[75] Inventors: Haren S. Gandhi, Farmington Hills; Joseph T. Kummer, Ypsilanti; Mordecai Shelef, Birmingham; Henryk K. Stepien; Hsien C. Yao, both of Dearborn Heights, all of Mich.

[73] Assignee: Ford Motor Company, Dearborn, Mich.

[21] Appl. No.: 19,816

[22] Filed: Mar. 12, 1979

[51] Int. Cl.$^3$ .................... B01J 21/06; B01J 23/46
[52] U.S. Cl. ............................... 252/472; 423/213.5
[58] Field of Search ................. 252/472; 423/213.5

[56] References Cited

U.S. PATENT DOCUMENTS

| | | | |
|---|---|---|---|
| 3,886,260 | 5/1972 | Unland | 423/213.5 |
| 4,020,013 | 4/1977 | Brennan | 252/472 X |
| 4,076,792 | 4/1972 | Foster et al. | 252/466 PT |

FOREIGN PATENT DOCUMENTS 49-102592  9/1974  Japan ............................ 423/213.5

Primary Examiner—W. J. Shine
Attorney, Agent, or Firm—William E. Johnson; Keith L. Zerschling

[57] ABSTRACT

A catalyst system and method of making the same is taught for treating exhaust gases from an internal combustion engine. A catalyst system includes a substrate and a washcoat on the substrate. The washcoat is formed of zirconia. A catalyst is placed on the washcoat consisting of rhodium metal or rhodium metal with another catalyst metal. By using zirconia as a washcoat, the rhodium is not dissolved into the washcoat during periods when the catalyst system is subjected to high temperature oxidizing conditions, as is the case when a gamma alumina washcoat is used.

2 Claims, 1 Drawing Figure

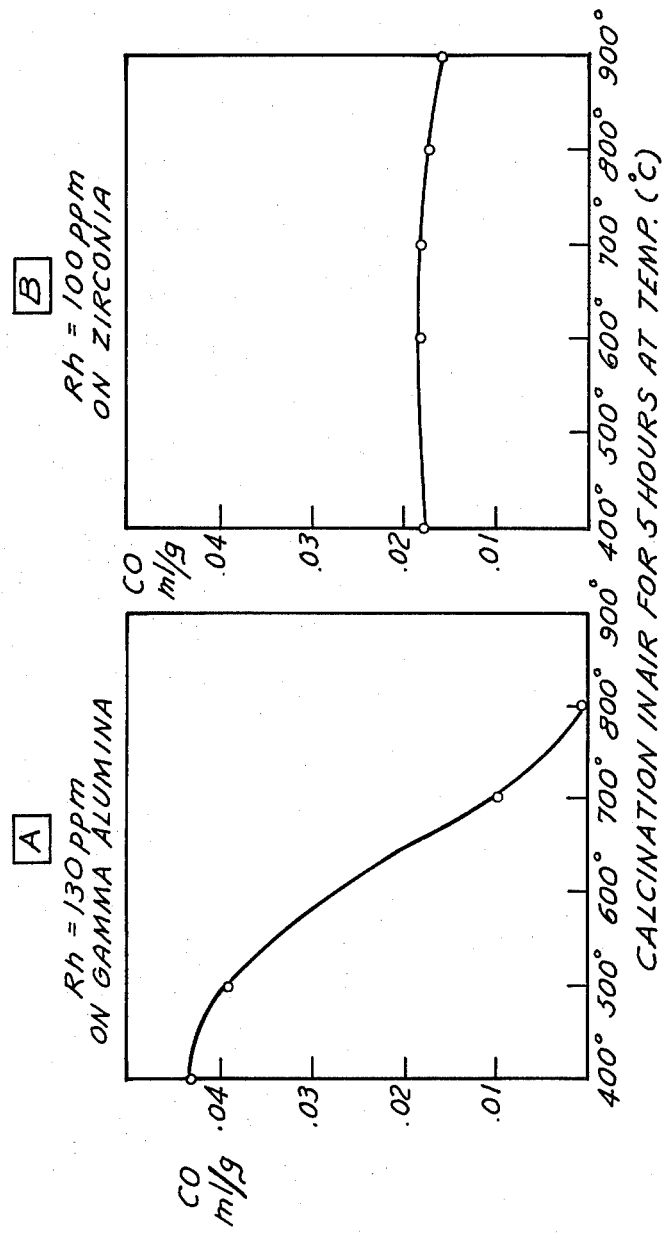

CATALYST OF RHODIUM ON ZIRCONIA

BACKGROUND OF THE INVENTION AND PRIOR ART STATEMENT

Rhodium is an active metal component used in three-way catalyst systems for the reduction of oxides of nitrogen to nitrogen. Rhodium is selective in the reduction of oxides of nitrogen by carbon monoxide in the presence of excess oxygen. In a condition where there is not an excess of oxygen, rhodium reduces oxides of nitrogen to nitrogen with little formation of ammonia.

Rhodium is a by-product of the mining of platinum. On a world-wide basis, normally about 17 units of platinum are mined for each unit of rhodium. Therefore, the rhodium content of any catalyst system must be used effectively and its effectiveness must be maintained during the operative life of the catalyst system.

As reported in the Journal of Catalysis, Volume 50, pages 407 to 418 (December, 1977), in an article entitled "Surface Interaction in the System $Rh/Al_2O_3$", rhodium interacts strongly with gamma alumina, which is normally used as a washcoat material for catalyst systems. Under oxidizing conditions at elevated temperatures, rhodium diffuses into the bulk of the gamma alumina. This diffused and dissolved rhodium is only partly recovered when reducing conditions are once again established over the catalyst system. Thus, exposure of a rhodium containing catalyst system, based upon a gamma alumina washcoat to high temperature conditions, results in the loss of rhodium as an effective catalyst material over the life of the catalyst system.

It is a particular object of this invention to provide a catalyst system in which rhodium may be employed as a catalyst and the effectiveness of that rhodium is maintained over the life of the catalyst system.

In our earlier patent application, Ser. No. 943,591 now U.S. Pat. No. 4,172,047 entitled "Catalyst-Rhodium on Alpha Alumina", we taught a catalyst system based on rhodium in which alpha alumina was used as a washcoat, rather than gamma alumina. We taught in that patent application that use of alpha alumina as the washcoat reduced the reaction of rhodium with the washcoat and thereby its subsequent loss as an effective catalyst metal.

SUMMARY OF THE INVENTION

This invention relates to a catalyst system and, more particularly, to a catalyst system based upon rhodium.

In accordance with the teachings of this invention, a catalyst system is formed as follows. A substrate is selected. A washcoat is applied to the substrate to increase the surface area thereof. The washcoat is formed substantially of zirconia. A catalyst is placed on the washcoat. This catalyst is a catalyst formed of rhodium, or of rhodium and other catalyst metals. The rhodium does not dissolve into the zirconia to the extent it would dissolve into gamma alumina when the catalyst system is exposed to oxidizing conditions under elevated temperatures.

This invention also relates to a method of protecting rhodium from dissolving into a washcoat by making the washcoat material zirconia.

BRIEF DESCRIPTION OF THE DRAWINGS

FIG. 1 is a graphical presentation of data which compares two rhodium based catalysts, one on gamma alumina and the other on zirconia, in a situation where each had been calcined for a period of five hours at the temperature indicated. Subsequent to calcination, the catalyst is subjected to chemisorption measurements. The amount of CO adsorbed by the catalyst is an indication of the surface area of the rhodium still present on the surface of the catalyst after calcination.

DESCRIPTION OF THE PREFERRED EMBODIMENT

This invention teaches the use of zirconia as a washcoat material to minimize an interaction between rhodium and the washbcoat and thereby maintain a higher rhodium dispersion on a catalyst substrate. As previously noted, literature reports that rhodium is dissolved into gamma alumina when a system containing these elements is heated to an elevated temperature in an oxygen environment. Gamma alumina is the most used washcoat material from a commercial standpoint. When rhodium of a catalyst system dissolves into gamma alumina, the effectiveness of the rhodium as a catalyst element is reduced. Over the lifetime of such a catalyst system, the catalytic capabilities are seriously decreased by dissolving of the rhodium into a gamma alumina base.

We have found that one may substantially reduce this dissolving if the gamma alumina washcoat is replaced by a zirconia washcoat. A zirconia washcoat is not used in commercial catalysts because of its relatively low surface area when compared to gamma alumina. However, we have found that it is desirable to use this material as a washcoat when rhodium is involved, even though it has a low surface area because it substantially reduces the amount of rhodium which dissolves into the washcoat material, thereby rendering the catalyst system more effective over a prolonged period of time. The need for a higher surface area washcoat may not be as critical anymore since the contaminant levels of lead and phosphorous in gasoline have decreased significantly over the last four to five years (from 0.03 g/gal Pb to 0.003 g/gal Pb). The higher surface area washcoat provided a sink for distribution of these contaminants and thereby decreased the probability of poisoning active metal components of catalysts. However, with significant decrease in contaminant levels, lower surface area materials may be acceptable.

A substrate for the catalyst system is selected. The substrate may be of the general type known, such as a monolithic ceramic substrate, a monolithic metallic substrate, or pelletized catalyst substrate made of the zirconia washcoat material. The substrate is washcoated with a desired amount of zirconia, for example, 10 to 15% by weight of the weight of the substrate. The zirconia is applied by making a colloidal dispersion containing the desired washcoat material with an amount to obtain 10 to 15 weight % zirconia on the substrate. The zirconia is dried onto the substrate in air at 120° C. and subsequently calcined at 600° C. for four hours.

The catalyst material to be applied to the catalyst system is a rhodium based catalyst. By this we mean the catalyst is all rhodium or a mixture of rhodium with some other catalyst, as is well known in the art, to obtain other benefits. For example, one may make a catalyst system based on rhodium and platinum in which the rhodium to platinum ratio is generally one unit of rhodium per 17 units of platinum, which is the mine ratio generally of these materials on a world-wide basis. The rhodium should be applied in a small, but effective, amount. Generally, 0.02% by weight of the substrate is a sufficient amount of rhodium. The rhodium may be present, if desired, in a range from 0.005% to 0.1% by weight of the substrate.

In order to demonstrate what occurs if a gamma alumina substrate is used, the following example will be described. Two ceramic monoliths were selected. One ceramic monolith was impregnated with a 10% by weight gamma alumina (manufactured as Dispal-M from Continental Oil Co.). The washcoated substrate was dried at 120° C. and calcined at 600° C. for four hours in air. The second ceramic monolith was impregnated with 10 weight % zirconia (manufactured by Zirar Products, Inc.). This washcoated substrate was dried at 120° C. and calcined at 600° C. for four hours in air. An attempt was then made to coat both samples with the same amount of rhodium, approximately 100 parts per million. However, in our coating, the substrate on gamma alumina received a coating of 130 ppm, while the material on zirconia received a coating of 100 ppm.

The two substrates were then calcined at various temperatures for a period of five hours. The data obtained from the treatment of these materials is shown in FIG. 1. It should be noted that the system rhodium on gamma alumina was heated for five hours at temperatures of 400°, 500°, 700° and 800° C. The system rhodium on zirconia was heated for a period of five hours at 400°, 600°, 700°, 800° and 900° C. After each heating for five hours at a particular temperature, the substrates were subjected to carbon monoxide chemisortion and the amount of carbon monoxide adsorbed on the surface of the catalyst was measured. The purpose of this is that this mesurement is an indication of the amount of rhodium still available on the surface. The rhodium is effective to adsorb carbon monoxide, the more rhodium being present, the more carbon monoxide being adsorbed.

As indicated in FIG. 1A, the rhodium on gamma alumina had a definite deterioration of the rhodium available as the temperature of heat treatment was increased. In fact, by the time the sample was subjected to the 800° C. treatment, there was no rhodium present on the surface. On the other hand, by reference to FIG. 1B, it is seen that almost all of the rhodium area on zirconia was maintained, even though temperatures in excess of 800° C. and up to 900° C. were reached. The reason that there is less rhodium shown at the common starting position of 400° C., is in part due to the lower rhodium loading (100 ppm Rh) on zirconia washcoat, as compared to 130 ppm Rh on gamma alumina washcoat. The other reason is that somewhat better dispersion is obtained on gamma alumina than on zirconia.

The dramatic effect, however, is that the rhodium area is not lost at the higher operating temperatures of 900° C. Such higher temperatures are anticipated for catalysts located close to exhaust manifold during cold start conditions when fuel rich exhaust with excess oxygen is passed on to the catalyst. The reactions between unburned hydrocarbons and carbon monoxide with excess oxygen produces severe exothermic heat of reaction raising the catalyst temperature to the range of 800° C. to 900° C. and above.

While the catalytic converter shown in Example 1A is better than the one shown in Example 1B, with respect to total surface area of rhodium at a temperature of 400° C., it falls way behind the zirconia washcoat catalyst system in actual operating temperature ranges because the rhodium dissolves into the bulk of the gamma alumina.

Thus, we teach herein that the use of a zirconia washcoat, in conjunction with a rhodium based catalyst, is highly desirable even though the zirconia has a lower initial surface area than gamma alumina. The high desirability of using this washcoat comes about in the fact that there is not a substantial dissolving of the rhodium into the washcoat material under operating conditions.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A catalyst system which comprises:
   a substrate;
   a washcoat on said substrate, said washcoat consisting essentially of zirconia; and
   a catalyst on said washcoat, said catalyst consisting essentially of rhodium.

2. A method of reducing the migration of rhodium into a washcoat of a catalyst system which comprises the following steps:
   selecting a substrate;
   applying a washcoat on said substrate, said washcoat consisting essentially of zirconia; and
   applying a catalyst on said washcoat, said catalyst consisting essentially of rhodium.

* * * * *